United States Patent
Mikita et al.

(10) Patent No.: US 9,539,542 B2
(45) Date of Patent: Jan. 10, 2017

(54) CATALYST FOR PURIFYING EXHAUST GAS

(75) Inventors: Kosuke Mikita, Hyogo (JP); Masanori Ikeda, Hyogo (JP); Shinji Sugihara, Hyogo (JP); Hideki Goto, Hyogo (JP); Takahiro Ikegami, Hyogo (JP)

(73) Assignee: UMICORE SHOKUBAI JAPAN CO., LTD., Tokyo (JP)

( * ) Notice: Subject to any disclaimer, the term of this patent is extended or adjusted under 35 U.S.C. 154(b) by 0 days.

(21) Appl. No.: 13/983,022

(22) PCT Filed: Jan. 27, 2012

(86) PCT No.: PCT/JP2012/051851
§ 371 (c)(1),
(2), (4) Date: Oct. 9, 2013

(87) PCT Pub. No.: WO2012/105454
PCT Pub. Date: Aug. 9, 2012

(65) Prior Publication Data
US 2014/0037524 A1    Feb. 6, 2014

(30) Foreign Application Priority Data

Feb. 1, 2011    (JP) .................. 2011-019896

(51) Int. Cl.
*B01D 53/94*    (2006.01)
*B01J 23/63*    (2006.01)
(Continued)

(52) U.S. Cl.
CPC ............. *B01D 53/94* (2013.01); *B01D 53/945* (2013.01); *B01J 21/066* (2013.01); *B01J 23/63* (2013.01);
(Continued)

(58) Field of Classification Search
CPC ............. B01J 23/63; B01J 23/10; B01J 21/066; B01J 2523/3712; C01G 25/00
(Continued)

(56) References Cited

U.S. PATENT DOCUMENTS 8,337,791 B2 * 12/2012 Kohara et al. .............. 423/213.2
2006/0052243 A1    3/2006 Muhammed et al.
(Continued)

FOREIGN PATENT DOCUMENTS

JP    2004-337840 A    12/2004
JP    2005-052779 A    3/2005
(Continued)

OTHER PUBLICATIONS

Mikhail Brik, Pyrochlore Structural Chemistry: Predicting the lattice constant by the ionic radii and electronegativities of the constituing ions, 2012, J. Am. Ceram. Soc., 95, 1454-1460.*
(Continued)

*Primary Examiner* — Matthew E Hoban
*Assistant Examiner* — James Fiorito
(74) *Attorney, Agent, or Firm* — Buchanan Ingersoll & Rooney PC

(57) ABSTRACT

Provided is a catalyst for purifying an exhaust gas, the catalyst excelling in catalytic performance and oxygen storage capacity. The catalyst for purifying an exhaust gas is a catalyst for purifying an exhaust gas which includes a ceria-zirconia composite oxide having a pyrochlore structure and a ceria-zirconia composite oxide having a cubic crystal structure, wherein at least a part of the ceria-zirconia composite oxide is composited with the ceria-zirconia composite oxide.

13 Claims, 1 Drawing Sheet

(51) Int. Cl.
  *B01J 21/06* (2006.01)
  *C01G 25/00* (2006.01)
  *B01J 23/10* (2006.01)
  *F01N 3/08* (2006.01)
  *F01N 3/10* (2006.01)

(52) U.S. Cl.
  CPC .......... *B01D 2255/1023* (2013.01); *B01D 2255/1025* (2013.01); *B01D 2255/2061* (2013.01); *B01D 2255/2063* (2013.01); *B01D 2255/407* (2013.01); *B01D 2255/908* (2013.01); *B01J 23/10* (2013.01); *B01J 2523/3712* (2013.01); *C01G 25/00* (2013.01); *F01N 3/0864* (2013.01); *F01N 3/101* (2013.01); *Y02T 10/22* (2013.01)

(58) Field of Classification Search
  USPC .............................................. 502/304, 349
  See application file for complete search history.

(56) References Cited

U.S. PATENT DOCUMENTS

| | | |
|---|---|---|
| 2010/0061903 A1 | 3/2010 | Kohara et al. |
| 2011/0171092 A1 | 7/2011 | Wakita et al. |

FOREIGN PATENT DOCUMENTS

| | | | |
|---|---|---|---|
| JP | 2005-170774 A | 6/2005 | |
| JP | 2005-231951 A | 9/2005 | |
| JP | 2009-084061 A | 4/2009 | |
| JP | 2010-227798 A | 10/2010 | |
| WO | WO 2006/030763 A1 | 3/2006 | |
| WO | WO 2008/093471 A1 | 8/2008 | |
| WO | WO2010/064497 * | 6/2010 | ............. B01D 53/94 |

OTHER PUBLICATIONS

International Search Report (PCT/ISA/210) issued on May 1, 2012, by the Japanese Patent Office as the International Searching Authority for International Application No. PCT/JP2012/051851.

Written Opinion (PCT/ISA/237) issued on May 1, 2012, by the Japanese Patent Office as the International Searching Authority for International Application No. PCT/JP2012/051851.

H. Kishimoto et al., "Crystal structure of metastable K—CeZr04 phcase possessing an ordered arrangement of Ce and Zr ions", Journal of Alloys and Compounds, Nov. 8, 2000, pp. 94-103, vol. 312, No. 1-2.

R. Wang et al., Nanoscale compositional and structural evolution in ceria zirconia during cyclic redox treatments, J. Mater. Chem, Aug. 2, 2010, pp. 7497-7505, vol. 20, No. 25.

C. Brinkmeier, "Automotive three way exhaust aftertreatment under transient consitions: measurements, modeling and simulation", Doctoral Dissertation, [online], J, University of Stuttgart, Jan. 2, 2007, pp. 41-44.

International Preliminary Report on Patentability and Written Opinion issued in connection with PCT International Application No. PCT/JP2012/051851 (9 pages).

* cited by examiner (A)
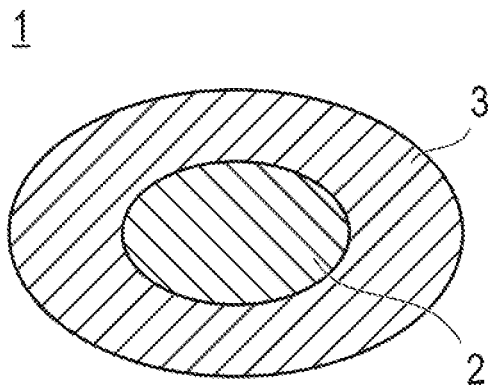
(B)
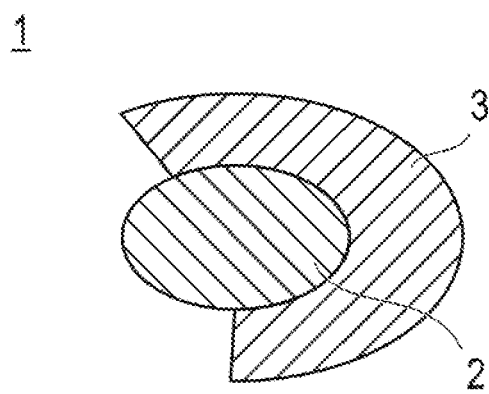
(C)
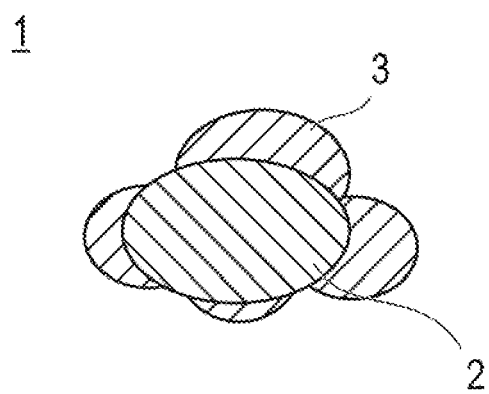

CATALYST FOR PURIFYING EXHAUST GAS

TECHNICAL FIELD

The present invention relates to a catalyst for purifying an exhaust gas. In particular, it relates to a catalyst for purifying an exhaust gas capable of maintaining excellent catalytic performance.

BACKGROUND ART

As a catalyst for purifying an exhaust gas generated from a gasoline engine, a three-way catalyst for simultaneous removal of nitrogen oxide (hereinafter, also referred to as "NOx"), carbon monoxide (hereinafter, also referred to as "CO"), and hydrocarbons (hereinafter, also referred to as "HC") has been suggested. Specifically, it is a catalyst having both functions of oxidizing CO and HC to $CO_2$ and reducing NOx to $N_2$. Many of such catalysts have oxygen storage capacity (hereinafter, also referred to as "OSC"), i.e., the catalyst itself accumulates oxygen when an exhaust gas is in oxygen excessive state (i.e., oxidizing atmosphere) while releases oxygen when an exhaust gas is in oxygen deficient state (i.e., reducing atmosphere). A co-catalyst component having such OSC is referred to as an oxygen storing material (hereinafter, also referred to as "OSC material"), which allows CO and HC to be efficiently oxidized to $CO_2$ even in oxygen deficient state. Examples of the known OSC material have been known to include cerium oxide ($CeO_2$) and ceria-zirconia composite oxide ($CeO_2$—$ZrO_2$ composite oxide). It has been known that, according to oxidation and reduction reaction of cerium (Ce) in the cerium oxide and ceria-zirconia composite oxide, absorption and release of oxygen occurs, and they have excellent OSC performance.

Ceria-zirconia composite oxide ($CeO_2$—$ZrO_2$ composite oxide) includes a ceria-zirconia composite oxide (A) having a pyrochlore structure (hereinafter, also simply referred to as "ceria-zirconia composite oxide (A)"), a ceria-zirconia composite oxide (B) having a cubic crystal (fluorite type) structure (hereinafter, also simply referred to as "ceria-zirconia composite oxide (B)"), a ceria-zirconia composite oxide (C) having a monoclinic structure, a ceria-zirconia composite oxide (D) having a tetragonal crystal structure, or the like. Among them, the ceria-zirconia composite oxide (A) has capability of absorbing and releasing a large amount of oxygen due to its pyrochlore structure (Patent Literature 1). Meanwhile, compared to the ceria-zirconia composite oxide (A) having a pyrochlore structure, the ceria-zirconia composite oxide (B) has a characteristic that it can rapidly absorb and release oxygen due to its cubic crystal (fluorite type) structure.

CITATION LIST

Patent Literature

Patent Literature 1: JP 2005-231951 A

SUMMARY OF INVENTION

Technical Problem

However, even if a ceria-zirconia composite oxide (A) is used, because a rate of absorbing and releasing oxygen, in particular a rate of releasing oxygen is slow, the purification performance is poor under the condition in which an exhaust gas has highly fluctuating atmosphere. Further, even if the ceria-zirconia composite oxide (B) is used, because an absorbing and releasing amount of oxygen is small, like the above, the purification performance cannot be obtained at sufficient level under the condition in which an exhaust gas has highly fluctuating atmosphere. Still further, simple combined use of the ceria-zirconia composite oxide (A) and the ceria-zirconia composite oxide (B) did not show the merits of them.

The present invention has been made under the circumstances described above, and an object of the present invention is to provide a catalyst for purifying an exhaust gas with excellent catalytic performance and excellent oxygen storage capacity (OSC).

Another object of the present invention is to provide a catalyst for purifying an exhaust gas with excellent catalytic performance and an excellent property of absorbing and releasing oxygen even after exposed to an exhaust gas at high temperature.

Solution to Problem

In order to solve the problems described above, the present inventors have conducted intensive studies, to find that, by using, as an OSC material, ceria-zirconia composite oxide in which a pyrochlore structure and a cubic crystal (fluorite type) structure are composited, a catalyst having excellent catalytic performance and oxygen storage capacity (OSC) can be obtained, and thus the present invention was completed.

Specifically, the present invention provides a catalyst for purifying an exhaust gas comprising a ceria-zirconia composite oxide (A) having a pyrochlore structure; and a ceria-zirconia composite oxide (B) having a cubic crystal structure, wherein at least a part of the ceria-zirconia composite oxide (A) is composited with the ceria-zirconia composite oxide (B).

Effects of the Present Invention

The catalyst for purifying an exhaust gas of the present invention has excellent catalytic performance and oxygen storage capacity (OSC).

BRIEF DESCRIPTION OF DRAWINGS

FIG. 1 is a schematic drawing of a catalyst according to the present invention.

DESCRIPTION OF EMBODIMENTS

The catalyst for purifying an exhaust gas of the present invention (hereinafter, also simply referred to as the "catalyst of the present invention") contains a ceria-zirconia composite oxide (A) having a pyrochlore structure (hereinafter, also simply referred to as "ceria-zirconia composite oxide (A)") and a ceria-zirconia composite oxide (B) having a cubic crystal (fluorite type) structure (hereinafter, also simply referred to as "ceria-zirconia composite oxide (B)") which composites with at least a part of the ceria-zirconia composite oxide (A). As used herein, "composite" means that, when a ceria-zirconia composite oxide (A), the ceria-zirconia composite oxide (B), and elements other than those included in the ceria-zirconia composite oxide (A) and the ceria-zirconia composite oxide (B) are admixed with one another, the ceria-zirconia composite oxide (A) and ceria-zirconia composite oxide (B) are in contact with each other on contact surface between the ceria-zirconia composite oxide (A) and the ceria-zirconia composite oxide (B) while elements other than those included in the ceria-zirconia composite oxide (A) and the ceria-zirconia composite oxide (B) are not present.

By a structure in which at least part of the ceria-zirconia composite oxide (A) is composited with the ceria-zirconia composite oxide (B), excellent oxygen storage capacity (i.e., excellent oxygen storage property and high rate of absorbing and releasing oxygen) can be achieved. Accordingly, the catalyst of the present invention can exhibit excellent catalytic performance.

Although the reason of attaining the effects described above remains unclear, it is assumed as follows. However, the present invention is not limited to the following assumptions. Specifically, although the ceria-zirconia composite oxide (A) has an ability of absorbing and releasing a large amount of oxygen due to its pyrochlore structure, it has a slow rate of absorbing releasing oxygen, in particular, a slow releasing rate. On the other hand, although the ceria-zirconia composite oxide (B) can rapidly absorb and release oxygen due to its cubic crystal (fluorite type) structure, it has a smaller amount of absorbing and releasing oxygen as compared to the ceria-zirconia composite oxide (A) having a pyrochlore structure.

For such reasons, when the catalyst according to the present invention absorbs oxygen, the ceria-zirconia composite oxide (B) rapidly absorbs oxygen due to its cubic crystal (fluorite type) structure. At that time, $Ce^{3+}$ turns into $Ce^{4+}$ (i.e., $Ce^{3+} \rightarrow Ce^{4+}$) in the ceria-zirconia composite oxide (B), and an oxygen concentration gradient is formed between a ceria-zirconia composite oxide (A) present as $Ce^{3+}$ and the ceria-zirconia composite oxide (B). Since the ceria-zirconia composite oxide (B) is composited with the ceria-zirconia composite oxide (A), the absorbed oxygen migrates to the ceria-zirconia composite oxide (A) having a pyrochlore structure, which is present in contact with the ceria-zirconia composite oxide (B), and gets absorbed therein. In such case, due to the pyrochlore structure, the ceria-zirconia composite oxide (A) can store a large amount of oxygen. Due to high oxygen absorption rate of the ceria-zirconia composite oxide (B) and high oxygen storage capacity of the ceria-zirconia composite oxide (A), the catalyst of the present invention can rapidly absorb and store a large amount of oxygen as compared to a case in which each is present singly. Thus, the catalyst of the present invention may also function as an OSC material which exhibits excellent oxygen storage capacity (OSC). On the other hand, when the catalyst of the present invention releases oxygen, the ceria-zirconia composite oxide (B) present in contact with the ceria-zirconia composite oxide (A) rapidly releases oxygen due to its cubic crystal (fluorite type) structure. Accompanying the release, $Ce^{4+}$ turns into $Ce^{3+}$ (i.e., $Ce^{4+} \rightarrow Ce^{3+}$) in the ceria-zirconia composite oxide (B), and an oxygen concentration gradient is formed between a ceria-zirconia composite oxide (A) present as $Ce^{4+}$ and the ceria-zirconia composite oxide (B). Because oxygen becomes deficient in the ceria-zirconia composite oxide (B), it receives oxygen from the ceria-zirconia composite oxide (A) which is present in contact with it. Due to the pyrochlore structure, the ceria-zirconia composite oxide (A) has excellent oxygen storage capacity (i.e., it can store a large amount of oxygen). Thus, according to high oxygen release rate of the ceria-zirconia composite oxide (B) and high oxygen storage capacity of the ceria-zirconia composite oxide (A), the catalyst of the present invention can rapidly release a large amount of oxygen as compared to a case in which each is present singly.

Thus, as a whole, the catalyst of the present invention can rapidly absorb and release a large amount of oxygen, and therefore it can exhibit excellent catalytic performance.

As shown in FIG. 1, the catalyst 1 of the present invention contains the ceria-zirconia composite oxide (A) 2 having a pyrochlore structure and the ceria-zirconia composite oxide (B) 3 having a cubic crystal (fluorite type) structure which composites at least part of the peripheral ceria-zirconia composite oxide (A) 2.

Herein, with regard to the composite state of the ceria-zirconia composite oxide (A) 2 with the ceria-zirconia composite oxide (B) 3, it is sufficient that at least part of the ceria-zirconia composite oxide (A) 2 is composited with the ceria-zirconia composite oxide (B) 3, and preferably it is coated with the ceria-zirconia composite oxide (B) 3. More specifically, as shown in FIG. 1A, it may have a structure in which the entire ceria-zirconia composite oxide (A) 2 is composited with the ceria-zirconia composite oxide (B) 3 or, as shown in FIG. 1B or 1C, a structure in which the ceria-zirconia composite oxide (A) 2 is partially composited with ceria-zirconia composite oxide (B) 3. Further, the composite ratio of a ceria-zirconia composite oxide (A) with a ceria-zirconia composite oxide (B) is not specifically limited if desired oxygen absorbing and releasing capacity can be achieved. However, it is preferably 50 to 100%, and more preferably 75 to 100%, relative to the surface area of the ceria-zirconia composite oxide (A), and as shown in FIG. 1A, a structure in which the entire ceria-zirconia composite oxide (A) 2 is composited with the ceria-zirconia composite oxide (B) 3 (i.e., composite ratio=100%) is particularly preferable. By this, the ceria-zirconia composite oxide (B) 3 can absorb oxygen rapidly and efficiently, and the absorbed oxygen quickly migrates toward the ceria-zirconia composite oxide (A) 2 present in the center. As a result, the catalyst of the present invention can rapidly absorb a large amount of oxygen. Similarly, when oxygen is released from the ceria-zirconia composite oxide (B) 3, a large amount of oxygen migrates from the ceria-zirconia composite oxide (A) 2 present in the center toward the ceria-zirconia composite oxide (B) 3 accompanying the release, and as a result, the oxygen is rapidly released from the ceria-zirconia composite oxide (B) 3. Consequently, the catalyst of the present invention can rapidly release a large amount of oxygen.

The catalyst of the present invention contains the ceria-zirconia composite oxide (A). Herein, the ceria-zirconia composite oxide (A) is not specifically limited, so long as it has a pyrochlore phase in its crystal structure. For example, those disclosed in WO 2008/093471 can be similarly used. As described herein, the "pyrochlore structure" is a structure represented by a chemical formula: $Ce_2Zr_2O_7$, in which Ce and Zr form a regular tetrahedral network, and is easily present in a reducing atmosphere. Under an oxidizing atmosphere, it forms a separate structure represented by $CeZrO_4$, and the two structures are reversibly converted to each other.

An exhaust gas discharged from a combustion engine has fluctuating oxygen concentration depending on change in operation condition. For such reasons, cerium (Ce) ion in ceria-zirconia composite oxide which is used for a catalyst for purifying an exhaust gas undergoes a valency change like $Ce^{3+}$ and $Ce^{4+}$. This may cause change in crystal structure of a ceria-zirconia composite oxide. However, in many cases, such change in crystal structure of a ceria-zirconia composite oxide is reversible. It is believed that such reversible change in crystal structure is also the same in the ceria-zirconia composite oxide (A) according to the present invention. Thus, even if the ceria-zirconia composite oxide (A) used as a raw material in the present invention may temporarily have a crystal structure different from pyrochlore structure in the catalyst composition, it is sufficient that if it has a pyrochlore structure under an atmosphere in which the oxide is used as a catalyst of the present invention.

Use amount of the ceria-zirconia composite oxide (A) of the present invention is not specifically limited. However, it is preferably 1 to 100 g, and preferably 3 to 50 g, per liter of the catalyst. With such use amount, the catalyst of the present invention can absorb and release a sufficient amount of oxygen.

With regard to the ceria-zirconia composite oxide (A), as long as Ce and Zr are contained as an essential constitutional element in addition to $Ce_2Zr_2O_7$ substantially consisting of Ce/Zr/O only, part of the constitutional elements may be substituted with a rare earth metal (rare earth element), a transition metal, an alkali metal, an alkali earth metal, or the like. Examples of the rare earth metal include, although not specifically limited, scandium (Sc), yttrium (Y), lanthanum (La), praseodymium (Pr), and neodymium (Nd). Meanwhile, cerium is not included in the "rare earth metal." Examples of the transition metal include, although not specifically limited, cobalt (Co) and nickel (Ni). Examples of the alkali metal include, although not specifically limited, sodium (Na), potassium (K), rubidium (Rb), and cesium (Cs). Examples of the alkali earth metal include, although not specifically limited, calcium (Ca), strontium (Sr), and barium (Ba). Further, a part of the constitutional components of the ceria-zirconia composite oxide (A) may be substituted with a metal component like magnesium (Mg), antimony, hafnium, tantalum, rhenium, bismuth, samarium, gadolinium, holmium, tulium, ytterbium, germanium, selenium, cadmium, indium, scandium, titanium, niobium, chrome, iron, silver, rhodium, and platinum. They may be used either singly or in combination of two or more. In addition, the other metal described above may be present, in the form of oxide, in the ceria-zirconia composite oxide (A). Among them, from the viewpoint of further enhancing heat resistance of an OSC material, it is preferable to include a rare earth metal, in particular, yttrium and/or lanthanum. Use amount of the other metal is, in terms of oxide, preferably 0.05 to 30% by weight, and more preferably 0.1 to 20% by weight, relative to the ceria-zirconia composite oxide (A). Further, the use amount of the other metal is, in terms of oxide, preferably 0.5 to 15 g, and preferably 3 to 10 g, per liter of the catalyst.

The difference in crystal structure between the OSC material according to the present invention and the ceria-zirconia composite oxide (B) having a cubic crystal structure can be clearly shown by X ray diffraction, if it is solely composed of an OSC material. In the OSC material according to the present invention, a peak originating from a pyrochlore structure is detected near $2\theta=14.5°$. Further, when the OSC material according to the present invention is added in a catalyst composition, the presence or absence of the addition can be characterized by diffraction pattern by TEM (Transmission Electron Microscope) and also by EDX (Energy Dispersive X-ray Spectroscopy). When a crystalline sample is radiated with an electronic beam by TEM, the electron beam is subjected to conversion/diffraction in the sample, and shows back scattering. As a result, diffraction pattern specific to the crystal structure is formed. Thus, the ceria-zirconia composite oxide (A) and the ceria-zirconia composite oxide (B), each having different structure, form a different diffraction pattern. Further, according to EDX, a specific X ray generated after applying electronic beam to a subject is detected, and from the energy distribution obtained from the X ray, constitutional material of the subject can be examined. When the OSC material according to the present invention is added, it is confirmed that no further element other than the elements derived from a ceria-zirconia composite oxide (A) and a ceria-zirconia composite oxide (B) is present on an interface between the ceria-zirconia composite oxide (A) and the ceria-zirconia composite oxide (B).

A weight ratio between cerium and zirconium that are contained in the ceria-zirconia composite oxide (A) or the like is, although not specifically limited, preferably 1:9 to 9:1 and more preferably 2:3 to 3:2, in terms of oxide. With such composition, excellent oxygen absorbing and releasing performance and heat resistance can be achieved.

Shape or the like of the ceria-zirconia composite oxide (A) is not specifically limited, if the desired properties like absorbing and releasing performance and heat resistance are obtained. Examples of the shape of the ceria-zirconia composite oxide (A) include particle shape, fine particle shape, powder shape, column shape, cone shape, prism shape, cubic shape, pyramid shape, and amorphous shape. Preferably, shape of the ceria-zirconia composite oxide (A) is particle shape, fine particle shape, or powder shape. When it has a shape of particle shape, fine particle shape, or powder shape, average particle diameter of the ceria-zirconia composite oxide (A) is not specifically limited. Average particle diameter of the cerium-zirconium composite oxide (A) is preferably in the range of 1 to 100 μm, and more preferably in the range of 1 to 20 μm. Meanwhile, the "average particle diameter" or the "particle diameter" used herein mean diameter. Further, although not specifically limited, a specific surface area of the cerium-zirconium composite oxide (A) is generally small. Specifically, the specific surface area of the cerium-zirconium composite oxide (A) is from 0.1 to 20 $m^2/g$.

A method for producing the ceria-zirconia composite oxide (A) according to the present invention is not specifically limited. Instead, a known method may be used as it is or with appropriate modifications. Hereinafter, preferred embodiments of the method for producing the ceria-zirconia composite oxide (A) according to the present invention will be described. However, the method for producing the ceria-zirconia composite oxide (A) according to the present invention is not limited to the following preferred embodiments.

Specifically, each raw material for cerium and zirconium is mixed with each other and melt by heating at predetermined temperature (e.g., 2000° C. or higher). After cooling, an ingot of $CeO_2$—$ZrO_2$ composite oxide is prepared, which is then crushed.

Herein, the raw material of cerium is not specifically limited, and specific examples thereof include nitrate, carbonate, sulfate, acetate, chloride, bromide, and oxide of cerium. The raw material of cerium may be used either singly, in combination of two or more, or in the form of composite oxide. Among them, considering melting under heating or the like, cerium oxide (i.e., ceria) is preferable. The cerium oxide may be an oxide obtained from nitrate, carbonate, sulfate, acetate, chloride, or bromide. Meanwhile, purity of the raw material of cerium is not specifically limited, but it is preferably highly pure, in particular, has purity of 99.9% or higher.

Further, a raw material of zirconium is not specifically limited, either. Specific examples thereof include nitrate, carbonate, sulfate, acetate, chloride, and bromide of zirconium; and zirconium elemental material like badelite, silica-removed zirconia, and zirconium oxide. The raw material of zirconium may be used either singly, in combination of two or more, or in the form of composite oxide. Among them, considering melting under heating or the like, zirconium oxide (i.e., zirconia) is preferable. The zirconium oxide may be an oxide obtained from nitrate, carbonate, sulfate, acetate, chloride, or bromide. In addition, the raw material of cerium and the raw material of zirconium may be a mixture of the raw materials or composite oxide of them. Meanwhile, purity of the raw material of zirconium is not specifically limited, but it is preferably highly pure, in particular, has purity of 99.9% or higher.

Further, in addition to the raw material of cerium and the raw material of zirconium described above, another component may be used in combination. Herein, the another component is not specifically limited, if they do not impair the properties of the ceria-zirconia composite oxide (A) (in particular, excellent oxygen absorbing and releasing property). Specific examples thereof include an alkali metal like potassium, rubidium, and cesium; magnesium, an alkali earth metal like calcium, strontium and barium; and a metal component like hafnium, rhenium, bismuth, yttrium, lanthanum (La), praseodymium, neodium, samarium, gadolinium, ytterbium, germanium, selenium, indium, titanium, iron, silver, rhodium, platinum, and palladium. Alternatively, the another component also includes those included by being originated from impurities in the raw material of cerium or raw material of zirconium. Further, when the another component is used in combination, use amount thereof is not specifically limited, if the characteristics of the ceria-zirconia composite oxide (A) (in particular, excellent oxygen absorbing and releasing property) are not impaired. It can be suitably selected in consideration of desired effects.

The raw material of cerium and the raw material of zirconium are admixed with each other at pre-determined ratio, added to a melting device, and melt by heating. Herein, the mixing ratio between the raw material of cerium and the raw material of zirconium is not specifically limited, if they exhibit a pyrochlore structure. The mixing ratio between the raw material of cerium and the raw material of zirconium (i.e., weight ratio in terms of oxide), is preferably 1:9 to 9:1, and more preferably 2:3 to 3:2. With such mixing ratio, excellent oxygen absorbing and releasing property and heat resistance can be achieved.

The raw material of cerium and the raw material of zirconium, and if necessary, another component(s), are admixed with each other, and the resulting mixture is melt under heating. The melting method is not specifically limited, if at least one in the mixture of the raw materials is melt. Specific examples thereof include an electric melting (arc type) and high frequency heat plasma method. Among them, an electric melting, and, in particular, a melting method using an arc type electric furnace is preferably used.

For a method of melting using an arc type electric furnace, to a mixture containing the raw material of cerium and the raw material of zirconium, and if necessary, another component(s) (i.e., a raw material mixture of ceria-zirconia composite oxide (A)), a conductive material (e.g., cokes) may be added. Accordingly, initial electric current can be promoted. Herein, an addition amount of the conductive material is not specifically limited, and it is sufficient that if it is an amount for promoting desired initial electric current. Addition amount of the conductive material may be suitably selected in consideration of mixing ratio between the raw material of cerium and the raw material of zirconium.

Further, condition for melting the raw material mixture of ceria-zirconia composite oxide (A) is not specifically limited, if at least one in the mixture of the raw materials is melt. For example, a secondary voltage is preferably 70 to 100 V. An average application power is preferably 80 to 100 kW. In addition, a heating temperature for the raw material mixture of ceria-zirconia composite oxide (A) is not specifically limited. It is sufficient that it allows melting of at least one. A melting point of a raw material oxide is high, for example, cerium oxide has melting point of 2200° C. and melting point of zirconium oxide is 2720° C. However, even for such case, there is an effect of melting point decrease, and thus a molten state may be obtained even when the melting (heating) temperature is lower than the melting point of oxide. The material may be added with a small amount of nitrate, carbonate, sulfate, chloride, or bromide of cerium or zirconium. Accordingly, melting may be promoted during the production process. Considering the above, the heating temperature of the raw material mixture of ceria-zirconia composite oxide (A) is preferably 2000° C. or higher, more preferably 2200° C. or higher, still more preferably 2400° C. or higher, and particularly preferably 2600° C. or higher. Further, the upper limit of the heating temperature for the raw material mixture is preferably 3000° C. or lower, and more preferably 2800° C. or lower, although not specifically limited thereto. Meanwhile, to lower the melting point, a trace amount of flux or the like may be added. When the elemental materials are added, the melting point of the raw material mixture varies depending on molar ratio between ceria and zirconia. Specifically, for a case in which $CeO_2/ZrO_2$ (molar ratio)=1/9, it is about 2600° C. For a case in which the molar ratio is 5/5, it is about 2200° C. For a case in which the molar ratio is 9/1, it is about 2000° C.

A time for heating the raw material mixture of ceria-zirconia composite oxide (A) is preferably from 0.5 to 3 hours. By maintaining for 0.5 hours or longer after the raw material mixture becomes in melt state, homogeneous melting can be achieved. Meanwhile, once the raw material mixture of ceria-zirconia composite oxide (A) is melt for a pre-determined period of time, it may be cooled by itself or kept in the melt state for a pre-determined period of time. For such case, a time of maintaining in the melt state is preferably from 1 to 2 hours. In addition, an atmosphere during melting is not specifically limited, and examples thereof include air, nitrogen, and inert gas like argon and helium. Further, a pressure during melting is not specifically limited, and any one of atmospheric pressure, increased pressure, and reduced pressure may be used. In general, it is performed under atmospheric pressure.

When the melting is completed, the melt mixture is cooled to produce an ingot of $CeO_2$—$ZrO_2$ composite oxide. For example, by covering an electric furnace with a carbon cover and cooling slowly for 20 to 30 hours, an ingot can be obtained. A method for cooling the melt includes, although not specifically limited, naturally cooling in an atmosphere to a temperature of 100° C. or less, and preferably 50° C. or less after taking it out from the melting apparatus. Accordingly, an ingot of ceria-zirconia composite oxide in which the raw material of cerium and raw material of zirconium are homogeneously present is obtained.

The ingot after melting is subsequently pulverized. Condition for pulverizing an ingot includes, although not specifically limited, pulverizing until particle diameter of the ceria-zirconia composite oxide (A) is preferably 3 mm or less, and more preferably 1 mm or less. Further, examples of a pulverizer which may be used include, although not specifically limited, a bath crusher and a roll crusher. Considering handling during the post treatment processes, it is preferable that the ingot is pulverized until it becomes powder of 1 mm or less and then subjected to classification. Meanwhile, impurities or the like can be separated from the obtained powder by magnetic separation, and if desired, sub-oxides formed during melting process or deformations in crystal caused by overcooling can be removed by oxidative calcination in an electric furnace or the like. Herein, condition for oxidative calcination is not specifically limited, if it allows oxidation of an ingot or powder, but the calcination can be generally carried out at 100° C. to 1000° C., and preferably 600° C. to 800° C. In addition, calcination time is, although not specifically limited, from 0.5 to 5 hours, and preferably 1 to 3 hours.

The powder obtained by the method described above may be subjected to fine pulverization in accordance with the intended use. Although not specifically limited, the fine pulverization may be performed for 5 to 30 min using a pulverizer like planetary mill, ball mill, or jet mill. Condition for fine pulverization includes, although not specifically limited, pulverizing finely until average particle diameter of the ceria-zirconia composite oxide is 0.3 to 2.0 μm, and more preferably 0.5 to 1.5 μm. Although the detailed reasons remain unclear, it is believed that surface area of the composite oxide is increased by fine pulverization, and thus large oxygen release can be achieved even in a low temperature region. Meanwhile, the average particle diameter can be measured by a known method using a laser diffraction and scattering analyzer or the like.

By this, the cerium-zirconium composite oxide (A) containing cerium and zirconium at the weight ratio of preferably 1:9 to 9:1, and more preferably 2:3 to 3:2 in terms of oxide ($CeO_2$, $ZrO_2$) can be obtained.

The ceria-zirconia composite oxide (A) can be subjected to heat durability test, and change in structure before and after the test can be measured by X ray diffractometer (XRD). For example, by confirming an exact overlap of waveforms of the main peak (corresponding to $Zr_{0.5}Ce_{0.5}O_2$) after calcination in hot air at 1050° C. and 1150° C., excellent thermal stability can be confirmed. In addition, if the above peak is very sharp, it is possible to conclude that there is a large crystal structure.

The catalyst of the present invention further contains the ceria-zirconia composite oxide (B). Herein, the ceria-zirconia composite oxide (B) is ceria-zirconia composite oxide having a cubic crystal and/or tetragonal crystal structure which substantially does not contain a pyrochlore phase, and those disclosed in WO 2008/093471 can be similarly used, for example. Accordingly, as long as the structure is different, the ceria-zirconia composite oxide (A) and the ceria-zirconia composite oxide (B) may have the same or different composition (i.e., constitutional elements). In addition, the presence or absence of a trace element may be different between them.

Use amount of the ceria-zirconia composite oxide (B) of the present invention is not specifically limited. However, it is preferably 5 to 100 g, and preferably 10 to 80 g, per liter of the catalyst. With such use amount, the catalyst of the present invention can absorb and release oxygen at sufficient rate.

Further, a mixing ratio between the ceria-zirconia composite oxide (A) and the ceria-zirconia composite oxide (B) is not specifically limited as long as the ceria-zirconia composite oxide (A) is composited with the ceria-zirconia composite oxide (B) to a desired degree. Specifically, the mixing ratio (weight ratio) between the ceria-zirconia composite oxide (A) and the ceria-zirconia composite oxide (B) is preferably 1:0.5 to 20, and more preferably 1:1 to 10. Within the range, the ceria-zirconia composite oxide (A) can be sufficiently composited with the ceria-zirconia composite oxide (B).

With regard to the ceria-zirconia composite oxide (B), it may substantially consist of Ce/Zr/O only. However, as long as Ce and Zr are contained as an essential constitutional element, part of the constitutional elements may be substituted with another metal. Examples of the another metal include a rare earth metal (rare earth element), a transition metal, an alkali metal, an alkali earth metal, or the like. Herein, the rare earth metal, transition metal, alkali metal, alkali earth metal, or the like are not specifically limited, and those exemplified above for the ceria-zirconia composite oxide (A) can be also mentioned. Alternatively, a part of the constitutional components of the ceria-zirconia composite oxide (B) may be substituted with a metal component like hafnium, rhenium, bismuth, gadolinium, ytterbium, germanium, selenium, indium, scandium, titanium, iron, silver, rhodium, palladium, and platinum. They may be used either singly or in combination of two or more. In addition, the another metal described above may be present, in the form of oxide, in the ceria-zirconia composite oxide (B). Among them, from the viewpoint of further enhancing heat resistance of an OSC material, it is preferable to include a rare earth metal, in particular, yttrium and/or lanthanum. Use amount of the another metal is, in terms of oxide, preferably 0.05 to 30% by weight, and more preferably 0.1 to 20% by weight, relative to the ceria-zirconia composite oxide (B). Further, use amount of the another metal is, in terms of oxide, preferably 0.5 to 15 g, more preferably 1 to 8 g, and particularly preferably 2 to 5 g, per liter of the catalyst.

A weight ratio between cerium and zirconium that are contained in the ceria-zirconia composite oxide (B) is, although not specifically limited, preferably 10:1 to 1:50, more preferably 5:1 to 1:40, still more preferably 6:1 to 1:12, and most preferably 4:1 to 1:8, in terms of oxide. With such composition, excellent rate of absorbing and releasing oxygen and heat resistance can be achieved. Further, a BET specific surface area of the cerium-zirconia composite oxide (B) is not specifically limited, if oxygen in exhaust gas can be absorbed (stored) and released at sufficient rate. Preferably, it is 30 to 500 $m^2/g$, more preferably 100 to 300 $m^2/g$, and particularly preferably 150 to 250 $m^2/g$.

Method for compositing the ceria-zirconia composite oxide (A) with the ceria-zirconia composite oxide (B) is not specifically limited. Herein below, a preferred embodiment of the method for compositing the ceria-zirconia composite oxide (A) with the ceria-zirconia composite oxide (B) will be explained. However, the present invention is not limited to the preferred embodiment described below.

Specifically, the ceria-zirconia composite oxide (A) is produced in the manner described above. Thus-obtained ceria-zirconia composite oxide (A) is added and mixed with an aqueous solution of raw materials containing the raw material of cerium, raw material of zirconium, and if desired, another metal like those described above (e.g., yttrium and lanthanum) and the like. Herein, the raw material of cerium and raw material of zirconium are not specifically limited, and those exemplified above for the method of producing the ceria-zirconia composite oxide (A) can be similarly used. Also, raw materials like another metal that are added as desired are not specifically limited, and those exemplified above for the method of producing the ceria-zirconia composite oxide (A) can be similarly used.

Next, the mixture is added with ammonia or an aqueous solution of ammonia for co-precipitation of cerium hydroxide and zirconium hydroxide. The addition amount of the ammonia is, although not specifically limited, an amount to give mixture liquid pH of 8 to 12, considering easy co-precipitation of cerium hydroxide and zirconium hydroxide. The mixture is filtered by suction and washed with pure water. The resultant is dried and calcined again. Herein, conditions for drying and calcination are not specifically limited, and in general, those well known in the field of catalyst can be similarly used. For example, it is preferable that the drying conditions include 1 to 5 hours at a temperature of 50 to 200° C. and the calcination conditions include 1 to 5 hours at a temperature of 200 to 700° C. Further, the drying and calcination are preferably carried out under air flow.

By this, a structural body having the ceria-zirconia composite oxide (A) composited with the ceria-zirconia composite oxide (B), in which the weight ratio of cerium and zirconium in terms of oxide ($CeO_2$, $ZrO_2$) is as described above, can be obtained (hereinafter, it is also referred to as an "OSC material of the present invention").

The catalyst of the present invention essentially contains the OSC material of the present invention having the ceria-zirconia composite oxide (A) composited with the ceria-zirconia composite oxide (B). Herein, use amount of the OSC material of the present invention is not particularly limited, if desired properties including excellent oxygen storage capacity (OSC), oxygen absorbing and releasing rate, catalytic performance, or the like can be exhibited. The use amount of the OSC material of the present invention is preferably 5 to 100 g, and more preferably 10 to 80 g, per liter of the catalyst. With such use amount, the OSC material of the present invention can exhibit excellent oxygen storage capacity (OSC) and oxygen absorbing and releasing rate, and thus the catalyst of the present invention can exhibit excellent catalytic performance.

The catalyst of the present invention essentially contains the OSC material of the present invention, but it may additionally contain another component. For example, the catalyst of the present invention preferably further contains a catalytically active component for directly catalyzing a chemical reaction for exhaust gas purification (i.e., oxidation and reduction reaction). Herein, considering catalytic activity or the like, preferred examples of the catalytically active component include a noble metal, although it is not specifically limited thereto.

Preferred examples of the noble metal that is used as a catalytically active component include, although not specifically limited, platinum, palladium, and rhodium. The noble metal may be used either singly or in combination of two or more types. Use amount of the noble metal is not specifically limited. For example, use amount of platinum is preferably 0.01 to 5 g, and more preferably 0.5 to 3 g, per liter of the catalyst. Use amount of palladium is preferably 0.1 to 20 g, and more preferably 0.5 to 10 g, per liter of the catalyst. Use amount of rhodium is preferably 0.01 to 3 g, and more preferably 0.03 to 1.5 g, per liter of the catalyst. Meanwhile, when two or more types of the noble metal are used, use amount of the noble metal means the total amount of them. Further, when the catalyst of the present invention has a layered structure with two or more layers, the use amount of the noble metal means the amount in each catalyst layer.

In addition to the noble metal or as a substitute for the noble metal, the catalyst of the present invention also may contain, as other component, at least one member selected from the group consisting of a refractory inorganic oxide, and a refractory inorganic oxide including a rare earth metal (excluding cerium), a transition metal (excluding zirconium), and an alkali earth metal. The refractory inorganic oxide may be used as a carrier for supporting a catalytically active component like noble metal, rare earth metal, and other metal element thereon. The refractory inorganic oxide is not specifically limited, if it is generally used as a carrier for catalyst. Specifically, preferred examples thereof include aluminum oxide ($Al_2O_3$) like α-alumina, and γ, δ, η, θ active alumina; silicon oxide ($SiO_2$); titanium oxide (titania) ($TiO_2$); zirconium oxide ($ZrO_2$); phosphorus oxide ($P_2O_5$); phosphoric acid zeolite; or composite oxide thereof including alumina-titania composite oxide, alumina-zirconia composite oxide, titania-zirconia composite oxide, and ceria-zirconia composite oxide. Among them, aluminum oxide, silicon oxide (silica), phosphorus oxide, titanium oxide, zirconium oxide, and ceria-zirconia composite oxide are preferable. Silicon oxide (silica), zirconium oxide, aluminum oxide, and ceria-zirconia composite oxide are more preferable. Zirconiumoxide, aluminumoxide, ceria-zirconia composite oxide, and powder of active alumina are still more preferable. The refractory inorganic oxide may be used either singly or in combination of two or more. Further, it may be used in the form of oxide as described above, but those capable of forming oxide by heating can be also used. For the latter, hydroxide, nitrate, halide like chloride, acetate, sulfate, and carbonate, or the like of aluminum, silicon, titanium, zirconium, and phosphorus may be used. Further, the refractory inorganic oxide may contain other metal. Examples of the other metal include, although not specifically limited, rare earth metal like scandium (Sc), yttrium (Y), lanthanum (La), praseodymium (Pr), and neodymium (Nd) (with the proviso that, cerium is excluded; as the case may be); transition metal like cobalt (Co) and nickel (Ni) (with the proviso that, iron and zirconium are excluded; as the case may be); and alkali earth metal like magnesium (Mg) and barium (Ba). Other metal may be used either singly or in combination of two or more. Among them, it is preferable that yttrium and/or lanthanum are included in the refractory inorganic oxide. In addition, when the refractory inorganic oxide contains the other metal, use amount thereof is, in terms of oxide, preferably 0.5 to 10 g, and more preferably 2 to 5 g, relative to 100 g of the refractory inorganic oxide. Meanwhile, when two or more of the other metals are used, the use amount of the other metal means the total amount of them. Further, when the catalyst of the present invention has a layered structure with two or more layers, the use amount of the other metal means the amount in each catalyst layer.

When the catalyst of the present invention further contains refractory inorganic oxide, use amount of the refractory inorganic oxide is, although not specifically limited, preferably 10 to 300 g, and more preferably 30 to 150 g, per liter of the catalyst. Meanwhile, when two or more types of the refractory inorganic oxide are used, the use amount of the refractory inorganic oxide means the total amount of them. Further, when the catalyst of the present invention has a layered structure with two or more layers, the use amount of the refractory inorganic oxide means the amount in each catalyst layer. When it is the same or higher than 10 g, not only the catalytically active component like noble metal can be sufficiently dispersed but also durability can be obtained at sufficient level. On the other hand, when it is the same or less than 300 g, the catalytically active component like noble metal can be appropriately in contact with exhaust gas, to induce easy temperature increase. As a result, the oxidation and reduction reaction can be desirably performed. Further, a BET specific surface area of the refractory inorganic oxide is preferably 50 to 750 m²/g, and more preferably 150 to 750 m²/g, from the viewpoint of supporting the catalytically active component like noble metal. Further, regarding a size of the refractory inorganic oxide, although not specifically limited, an average particle diameter is preferably 0.5 to 150 μm, and more preferably 1 to 100 μm if it is in powder form, for example.

As for the refractory inorganic oxide for a case in which the catalyst of the present invention further contains refractory inorganic oxide containing a rare earth metal (excluding cerium), a transition metal (excluding zirconium), and an alkali earth metal, those specifically described above can be used with the use amount described above. Examples of the rare earth metal (excluding cerium) include scandium (Sc), yttrium (Y), lanthanum (La), praseodymium (Pr), and neodymium (Nd), although not specifically limited thereto. The rare earth metal is generally used in the form of oxide. Use amount of the rare earth metal (excluding cerium) is, in terms of oxide, preferably 0.5 to 10 g, and more preferably 2 to 5 g per liter of the catalyst. Examples of the alkali earth metal include calcium (Ca) and barium (Ba), although not specifically limited thereto. The alkali earth metal is generally used in the form of oxide. Use amount of the alkali earth metal is, in terms of oxide, preferably 0.5 to 20 g, and more preferably 2 to 10 g, per liter of the catalyst. Examples of the transition metal include cobalt (Co) and nickel (Ni), although not specifically limited thereto. The transition metal is generally used in the form of oxide. Use amount of the transition metal is, in terms of oxide, preferably 0.01 to 20 g, and more preferably 0.1 to 10 g, per liter of the catalyst.

Alternatively, the catalyst of the present invention may further contain, as a substitute for the above component or in addition to at least one of the above component, a co-catalyst component. The co-catalyst component is not specifically limited, and any co-catalyst components well known in the field of catalyst can be used. Examples thereof include a rare earth metal, an alkali earth metal, and other transition metal. The co-catalyst component is generally present in the form of oxide in the catalyst. Examples of the rare earth metal (excluding cerium) include scandium (Sc), yttrium (Y), lanthanum (La), praseodymium (Pr), and neodymium (Nd), although not specifically limited thereto. The rare earth metal is generally used in the form of oxide. Use amount of the rare earth metal (excluding cerium) is, in terms of oxide, preferably 0.5 to 10 g, and more preferably 2 to 5 g, per liter of the catalyst. Examples of the alkali earth metal include magnesium (Mg) and barium (Ba). The alkali earth metal is generally used in the form of oxide, but it may be used in the form of carbonate or sulfate. Use amount of the alkali earth metal is, in terms of oxide, preferably 0.5 to 20 g, and more preferably 2 to 10 g, per liter of the catalyst. Examples of other transition metal include cobalt (Co) and nickel (Ni), although not specifically limited thereto. The transition metal is generally used in the form of oxide. Use amount of the transition metal is, in terms of oxide, preferably 0.01 to 20 g, and more preferably 0.1 to 10 g, per liter of the catalyst. The co-catalyst component may be dispersed singly in a catalyst layer, or it may be supported on the ceria-zirconia composite oxide (A) or refractory inorganic oxide. Meanwhile, when two or more of the co-catalyst are used, the use amount of the co-catalyst means the total amount of them. Further, when the catalyst of the present invention has a layered structure with two or more layers, the use amount of the co-catalyst means the amount in each catalyst layer.

Alternatively, the catalyst of the present invention may further contain, as a substitute for the above component or in addition to at least one of the above component, an OSC material. The OSC material is not specifically limited, and any OSC material well known in the field of catalyst can be used. Specific examples thereof include ceria-zirconia composite oxide ($CeO_2$—$ZrO_2$ composite oxide) having a pyrochlore structure only, cerium oxide ($CeO_2$) having a cubic crystal (fluorite type) structure only, zirconium oxide ($ZrO_2$) having a cubic crystal (fluorite type) structure only, and ceria-zirconia composite oxide ($CeO_2$—$ZrO_2$ composite oxide) having a cubic crystal (fluorite) structure only. Use amount of the OSC material is, although not specifically limited, preferably 5 to 150 g, and more preferably 10 to 120 g, per liter of the catalyst.

The catalyst of the present invention may be used by itself, but it is preferably supported on a carrier. Any carrier which has been generally used in the field may be used without limitation, but a three-dimensional structural body is preferably used. Examples of the three-dimensional structural body include a refractory carrier like a honeycomb carrier. Further, the three-dimensional structural body is preferably an integrally molded body (i.e., an integrally structured body), and examples thereof which may be preferably used include a monolithic carrier, a metal honeycomb carrier, a plugged honeycomb carrier like a diesel particulate filter, and a punching metal. Further, it is not necessarily required to use a three-dimensional integral structural body, and a pellet carrier or the like may be also used, for example.

As for the monolithic carrier, those generally referred to as ceramic honeycomb carrier can be used. In particular, those made of cordierite, mullite, α-alumina, silicon carbide, silicon nitride, or the like are preferable. Among them, those made of cordierite (i.e., cordierite carrier) are particularly preferable. In addition, an integral structural body obtained by using refractory metal having resistance to oxidation including stainless steel, Fe—Cr—Al alloy, or the like can be used.

The monolithic carrier is produced by an extrusion molding method or a method of winding a sheet-like element followed by hardening. Shape of gas air inlet (cell shape) may be any one of hexagonal, rectangular, triangular, or corrugation. It may be sufficiently used when the cell density (number of cell/unit area) is 100 to 1200 cells/square inch. It is preferably 200 to 900 cells/square inch, and more preferably 250 to 500 cells/square inch. A method for supporting the catalyst of the present invention on a three-dimensional structural body is not specifically limited, and a wash coating or the like can be used, for example.

Hereinafter, preferred embodiments of the method for producing the catalyst of the present invention will be explained. However, it is should be noted that the present invention is not limited those preferred embodiments.

Specifically, the OSC material according to the present invention, and if desired, other components described above, for example, a raw material of noble metal, refractory inorganic oxide, refractory inorganic oxide including at least one selected from the group consisting of a rare earth metal (excluding cerium), a transition metal (excluding zirconium), and an alkali earth metal, and a co-catalyst component, or the like are suitably weighed and mixed according to desired composition, stirred for 0.5 to 24 hours at 5 to 95° C., and subjected to wet-grinding, to give a slurry. The slurry is brought into contact with a carrier as described above (e.g., a three-dimensional structural body), and dried in air at a temperature of 50 to 300° C., and preferably 80 to 200° C. for 5 min to 10 hrs, and preferably 5 min to 8 hrs. Next, it is calcined at a temperature of 300 to 1200° C., and preferably 400 to 800° C. for 30 min to 10 hrs, and preferably 1 hr to 5 hrs. Subsequently, the slurry (B) is brought into contact with the carrier coated with the slurry (A), and dried in air at a temperature of 50 to 300° C., and preferably 80 to 200° C. for 5 min to 10 hrs, and preferably 5 min to 8 hrs. Next, it was calcined at the temperature of 300 to 1200° C., and preferably 400 to 800° C. for 30 min to 10 hrs, and preferably 1 hr to 5 hrs, and as a result, the catalyst of the present invention is obtained.

Meanwhile, as long as the OSC material according to the present invention is contained, the catalyst of the present invention may have a single layer of the catalyst layer or may have a multi-layered structure in which two or more catalyst layers are laminated. For a case in which the catalyst of the present invention has a multi-layered structure in which two or more catalyst layers are laminated, the OSC material according to the present invention may be disposed in any catalyst layer. Preferably, the OSC material according to the present invention is disposed in a layer which contains at least palladium. According to such disposition, the OSC material according to the present invention can show its performance at maximum level. In addition, another catalyst layer not containing the OSC material according to the present invention is not specifically limited, and it may be any catalyst layer known in the field of catalyst. For example, except that the OSC material according to the present invention is not used, the same constitution (component) as described above can be used. In addition, the constitution (component) in each catalyst layer may be the same, but different constitution is preferable. For example, for a noble metal, preferred examples of the noble metal in two catalyst layers (i.e., described as a combination of noble metal in lower catalyst layer and noble metal in upper catalyst layer) include, although not limited thereto, a combination of platinum and rhodium, a combination of palladium and rhodium, a combination of platinum, palladium, and rhodium, a combination of platinum, rhodium, and palladium, and a combination of palladium, rhodium, and platinum. With such combination, exhaust gas can be efficiently purified. Among them, a combination of platinum and rhodium and a combination of palladium and rhodium are more preferable. Meanwhile, although it is not necessary to include a noble metal in every catalyst layer, it is preferable to have it in every catalyst layer. Accordingly, the catalytic performance can be further enhanced.

The OSC material according to the present invention can exhibit excellent oxygen storage capacity (OSC), i.e., excellent oxygen storage performance and high rate of absorbing and releasing oxygen. In addition, even after exposed to high temperature of 700° C. or higher, the OSC material according to the present invention can exhibit excellent oxygen storage capacity (OSC), i.e., excellent oxygen storage performance and high rate of absorbing and releasing oxygen. For such reasons, the catalyst of the present invention can exhibit excellent catalytic performance even after exposed to high temperature. Accordingly, the catalyst of the present invention can be desirably used for purification of exhaust gas from a combustion engine, in particular, gasoline engine and diesel engine. Meanwhile, use condition for the catalyst of the present invention is not specifically limited. For example, a space velocity (S.V.) is 10,000 to 120,000 $h^{-1}$, preferably 30,000 to 100,000 $h^{-1}$. The catalyst of the present invention has excellent A/F fluctuation absorption and, even when the fluctuation width is ±1.0 or higher, excellent catalytic performance can be exhibited.

Further, a temperature of catalyst inlet during acceleration is preferably 0° C. to 1200° C., more preferably 0° C. to 800° C., and still more preferably 200° C. to 800° C. In particular, the catalyst of the present invention can maintain excellent catalytic performance even after exposed to high temperature like 800° C. or higher. The effect is more significant in a case in which it is exposed to high temperature like 900° C. or higher. Hydrocarbons discharged from a combustion engine vary depending on fuel in use. However, it is preferably fuel which may be used for an MPI engine. Preferably, it is gasoline, E10, E30, E100, or CNG, and even when it is diesel oil, dimethyl ether, or biodiesel, the catalyst of the present invention is effective if A/F value is lower than 14.7.

The catalyst of the present invention can singly exhibit catalytic activity at sufficient level. However, at the front stage (introduction side) or back stage (discharge side) of the catalyst of the present invention, the same or a different catalyst for purifying an exhaust gas may be also disposed. Preferably, the catalyst of the present invention may be disposed singly, the catalyst of the present invention may be disposed at both sides of the front stage (introduction side) and the back stage (discharge side), or the catalyst of the present invention is disposed at either of the front stage (introduction side) or the back stage (discharge side) and a conventionally known catalyst for purifying an exhaust gas is disposed at the other side. More preferably, the catalyst of the present invention is disposed singly or the catalyst of the present invention is disposed at both sides of the front stage (introduction side) and the back stage (discharge side).

EXAMPLES

Hereinafter, the effect by the present invention will be explained on the basis of the following examples and comparative examples. However, the technical scope of the present invention is not limited to the following examples.

Synthesis Example 1

First, each of highly pure zirconia (86 g) and highly pure ceria (114 g) was weighed and admixed with each other. The mixture was melt at the temperature of 2250° C. or higher by applying secondary voltage of 85 V, average application power of 99.5 kW, dwell time of 2 hrs, and total electricity amount of 182 kWh by using an arc type electric furnace.

Meanwhile, to promote initial electric current, 10 g of cokes was used. Once the melting is completed, the electric furnace is covered with a carbon cover and cooled slowly in air for 24 hours, to give an ingot. The resulting ingot was pulverized with a bath crusher and a roll crusher until it is 3 mm or less, and the powder of 1 mm or less was collected with a sieve. Further, to remove sub-oxides formed during melting process or deformations in crystal caused by overcooling, calcination was carried out at 800° C. in air for 3 hours in an electric furnace followed by pulverization for 10 min using a planetary mill, to give a ceria-zirconia composite oxide (A1) which has average particle diameter of 3.4 μm and specific surface area of 2.0 $m^2/g$. Meanwhile, the average particle diameter was measured by a laser diffraction and scattering analyzer. Further, as a result of analyzing the ceria-zirconia composite oxide (A1) using X ray diffractometer (XRD), it was confirmed that the ceria-zirconia composite oxide (A1) contains only a pyrochlore phase in the crystal structure. Thus, the ceria-zirconia composite oxide (A1) is $CeO_2$—$ZrO_2$ composite oxide which has a pyrochlore structure and ceria and zirconia composition ($CeO_2$:$ZrO_2$) of 57:43 (weight ratio).

Ion exchange water (500 g) containing ceria-zirconia composite oxide (A1) having a pyrochlore structure obtained from above (average particle diameter=3.4 μm, specific surface are =2.0 m²/g, ceria (CeO$_2$):zirconia (ZrO$_2$)= 57:43 (weight ratio)) (100 g), cerium nitrate (purity 99.0%) (317 g), zirconium oxy nitrate (purity 99.0%) (301.1 g), and lanthanum nitrate hexahydrate (107.2 g) was prepared. To the aqueous solution, 5% by weight ammonia water was added so as to give a final pH of 10.2, to induce co-precipitation of cerium hydroxide and zirconium hydroxide. Next, the mixture was filtered by suction and washed with pure water. The resultant was dried at 150° C. for 3 hrs, calcined at 500° C. for 2 hrs, and pulverized for 10 min using a planetary mill, to give a OSC material 1 which has average particle diameter of 2.1 μm and specific surface area of 53.7 m²/g. The OSC material 1 was subjected to diffraction pattern and EDX analysis using TEM, to be found that the ceria-zirconia composite oxide (A1) is composited with CeO$_2$—ZrO$_2$—La$_2$O$_3$ as a ceria-zirconia composite oxide (B1), and the ceria-zirconia composite oxide (B1) portion contains only a cubic crystal in its crystal structure. Specifically, the obtained OSC material 1 is an OSC material in which CeO$_2$—ZrO$_2$ (CeO$_2$: ZrO$_2$=57:43 (weight ratio)) having a pyrochlore structure is composited with CeO$_2$—ZrO$_2$—La$_2$O$_3$ having a cubic crystal structure, in which the composition is as follows; CeO$_2$: ZrO$_2$: La$_2$O$_3$=45:45:10 (weight ratio). Further, in the OSC material 1 thus obtained, the entire ceria-zirconia composite oxide (A1) is composited (coated) with the ceria-zirconia composite oxide (B1).

Synthesis Example 2

Ion exchange water (500 g) containing cerium nitrate (purity 99.0%) (579.9 g), zirconium oxy nitrate (purity 99.0%) (455.5 g), and lanthanum nitrate hexahydrate (133.0 g) was prepared. To the aqueous solution, 5% by weight ammonia water was added so as to give a final pH of 10.2, to induce co-precipitation of cerium hydroxide and zirconium hydroxide. Next, the mixture was filtered by suction and washed with pure water. The resultant was calcined at 500° C. for 2 hrs, and pulverized for 10 min using a planetary mill, to give the ceria-zirconia composite oxide (B2) which has average particle diameter of 2.2 μm and specific surface area of 70.0 m²/g. The ceria-zirconia composite oxide (B2) was analyzed by X ray diffractometer (XRD), to be found that the ceria-zirconia composite oxide (B2) contains only a cubic crystal in the crystal structure. Further, the composition is as follows; CeO$_2$: ZrO$_2$: La$_2$O$_3$=45:45:10 (weight ratio).

Synthesis Example 3

First, each of highly pure zirconia (235 g) and highly pure ceria (265 g) was weighed and admixed with each other. The mixture was melt at the temperature of 2250° C. or higher by applying secondary voltage of 85 V, average application power of 99.5 kW, dwell time of 2 hrs, and total electricity amount of 182 kWh by using an arc type electric furnace.

Meanwhile, to promote initial electric current, 25 g of cokes was used. Once the melting is completed, the electric furnace is covered with a carbon cover and cooled slowly in air for 24 hours, to give an ingot. The resulting ingot was pulverized with a bath crusher and a roll crusher until it is 3 mm or less, and the powder of 1 mm or less was collected with a sieve. Further, to remove sub-oxides formed during melting process or deformations in crystal caused by over-cooling, calcination was carried out at 800° C. in air for 3 hours followed by pulverization for 10 min using a planetary mill, to give a ceria-zirconia composite oxide (A2) which has average particle diameter of 3.4 μm and specific surface area of 2.0 m²/g. Meanwhile, the average particle diameter was measured by a laser diffraction and scattering analyzer. Further, as a result of analyzing the ceria-zirconia composite oxide (A2) using X ray diffractometer (XRD), it was confirmed that the ceria-zirconia composite oxide (A2) contains only a pyrochlore phase in the crystal structure. Further, the composition is as follows; CeO$_2$: ZrO$_2$=57:43 (weight ratio).

Synthesis Example 4

Ion exchange water (500 g) containing cerium nitrate (purity 99.0%) (317 g), zirconium oxy nitrate (purity 99.0%) (301.1 g), and lanthanum nitrate hexahydrate (107.2 g) was prepared. To the aqueous solution, 5% by weight ammonia water was added so as to give a final pH of 10.2, to induce co-precipitation of cerium hydroxide and zirconium hydroxide. Next, the mixture was filtered by suction and washed with pure water. The resultant was calcined at 500° C. for 2 hrs, and pulverized for 10 min using a planetary mill, to give the ceria-zirconia composite oxide (B3) which has average particle diameter of 2.2 μm and specific surface area of 70.0 m²/g. The ceria-zirconia composite oxide (B3) was analyzed by X ray diffractometer (XRD), to be found that the ceria-zirconia composite oxide (B3) contains only a cubic crystal (tetragonal crystal) in the crystal structure. Further, the composition is as follows; CeO$_2$: ZrO$_2$: La$_2$O$_3$=41:45.7:13.3 (weight ratio).

Example 1

Each raw material including palladium nitrate as palladium source, alumina (Al$_2$O$_3$), and the OSC material 1 obtained from Synthesis Example 1 above [i.e., OSC material in which CeO$_2$—ZrO$_2$ (CeO$_2$: ZrO$_2$=57:43 (weight ratio)) having a pyrochlore structure is composited with CeO$_2$—ZrO$_2$—La$_2$O$_3$ having a cubic crystal structure, in which the composition is as follows; CeO$_2$: ZrO$_2$: La$_2$O$_3$=45:45:10 (weight ratio)] was weighed so as to give a ratio of Pd:Al$_2$O$_3$:OSC material 1=3:52:60 (weight ratio). Then, the raw materials were admixed with one another, stirred for 1 hour, and then subjected to wet pulverization, to prepare a slurry (A).

Further, each raw material including rhodium nitrate as rhodium source, zirconia powder, CeO$_2$—ZrO$_2$—Y$_2$O$_3$ composite oxide (=30:60:10 (weight ratio)), and alumina (Al$_2$O$_3$) was weighed o as to give a ratio of Rh:ZrO$_2$: CeO$_2$—ZrO$_2$—Y$_2$O$_3$: Al$_2$O$_3$=0.2:20:30:30 (weight ratio). Then, the raw materials were admixed with one another, stirred for 1 hour, and then subjected to wet pulverization, to prepare a slurry (B).

The obtained slurry (A) was wash-coated on a honeycomb carrier made of cordierite having volume of 0.7 L (diameter 99.2 mm×length 90 mm), dried at 150° C., and calcined for 1 hour at 500° C. Total amount of each catalyst component derived from the slurry (A) was 115 g after the calcination. Each catalyst component derived from the slurry (A), which is contained per liter of the carrier, was as follows; Pd was 3 g, Al$_2$O$_3$ was 52 g, and the OSC material 1 was 60 g.

Next, the slurry (B) was wash-coated on the carrier coated with the slurry (A), dried at 150° C., and calcined for one hour at 500° C., to give a catalyst 1. Total amount of each catalyst component derived from the slurry (B) was 80.2 g after the calcination. Each catalyst component derived from the slurry (B), which is contained per liter of the carrier, was as follows; Rh was 0.2 g, $ZrO_2$ was 20 g, $CeO_2$—$ZrO_2$—$Y_2O_3$ was 30 g, and $Al_2O_3$ was 30 g.

Comparative Example 1

Except that the ceria-zirconia composite oxide (B2) obtained from Synthesis Example 2 [i.e., an OSC material having a cubic crystal structure only, in which $CeO_2$: $ZrO_2$: $La_2O_3$=45:45:10 (weight ratio)] is used in an amount of 60 g per liter of the carrier instead of the OSC material 1 of Example 1, a catalyst 2 was obtained in the same manner as Example 1.

Comparative Example 2

Each raw material including palladium nitrate as palladium source, alumina ($Al_2O_3$), and the ceria-zirconia composite oxide (A2) obtained from Synthesis Example 3 above [i.e., OSC material having a pyrochlore structure only, in which $CeO_2$: $ZrO_2$=57:43 (weight ratio)] was weighed so as to give a ratio of Pd:$Al_2O_3$:OSC material 3=3:65:47 (weight ratio). Then, the raw materials were admixed with one another, stirred for 1 hour, and then subjected to wet pulverization, to prepare a slurry (C).

The obtained slurry (C) was wash-coated on a honeycomb carrier made of cordierite having volume of 0.7 L, dried at 150° C., and calcined for 1 hour at 500° C. Total amount of each catalyst component derived from the slurry (C) was 115 g after the calcination. Each catalyst component derived from the slurry (C), which is contained per liter of the carrier, was as follows; Pd was 3 g, $Al_2O_3$ was 65 g, and the OSC material 3 was 47 g.

Next, the slurry (B) was wash-coated on the carrier coated with the slurry (C) in the same manner as Example 1, dried at 150° C., and calcined for one hour at 500° C., to give a catalyst 3.

Comparative Example 3

A catalyst 4 was obtained in the same manner as Example except that a mixture containing the ceria-zirconia composite oxide (B3), which has been obtained from Synthesis Example 4, in an amount of 45 g per liter of the carrier, and the ceria-zirconia composite oxide (A1), which has been obtained from Synthesis Example 1, in an amount of 15 g per liter of the carrier, was used instead of the OSC material 1 of Example 1. Meanwhile, the mixture was prepared by physically mixing the ceria-zirconia composite oxide (B3), which has only a cubic crystal structure and has the same composition as the ceria-zirconia composite oxide (B1) of Synthesis Example 1 with the ceria-zirconia composite oxide (A1), which has a pyrochlore structure only, so as to have the same composition as the OSC material 1 of Synthesis Example 1.

Example 2

Each raw material including palladium nitrate as palladium source, alumina ($Al_2O_3$), and the OSC material 1 obtained from Synthesis Example 1 above [i.e., OSC material in which $CeO_2$—$ZrO_2$ ($CeO_2$: $ZrO_2$=57:43 (weight ratio)) having a pyrochlore structure is composited with $CeO_2$—$ZrO_2$—$La_2O_3$ having a cubic crystal structure, in which the composition is as follows; $CeO_2$: $ZrO_2$: $La_2O_3$=45:45:10 (weight ratio)] was weighed so as to give a ratio of Pd:$Al_2O_3$:OSC material 1=3:52:60 (weight ratio). Then, the raw materials were admixed with one another, stirred for 1 hour, and then subjected to wet pulverization, to prepare a slurry (D).

Further, each raw material including rhodium nitrate as rhodium source, zirconia powder, $CeO_2$—$ZrO_2$—$Y_2O_3$ composite oxide (=30:60:10 (weight ratio)), and alumina ($Al_2O_3$) was weighed so as to give a ratio of Rh:$ZrO_2$: $CeO_2$—$ZrO_2$—$Y_2O_3$: $Al_2O_3$=0.15:20:30:30 (weight ratio). Then, the raw materials were admixed with one another, stirred for 1 hour, and then subjected to wet pulverization, to prepare a slurry (E).

The obtained slurry (D) was wash-coated on a honeycomb carrier made of cordierite having volume of 0.9 L (diameter 103 mm×length 105 mm), dried at 150° C., and calcined for 1 hour at 500° C. Total amount of each catalyst component derived from the slurry (D) was 119.5 g after the calcination. Each catalyst component derived from the slurry (D), which is contained per liter of the carrier, was as follows; Pd was 2.5 g, $Al_2O_3$ was 52 g, and the OSC material 1 was 60 g.

Next, the slurry (E) was wash-coated on the carrier coated with the slurry (D), dried at 150° C., and calcined for one hour at 500° C., to give a catalyst 5. Total amount of each catalyst component derived from the slurry (E) was 80.15 g after the calcination. Each catalyst component derived from the slurry (E), which is contained per liter of the carrier, was as follows; Rh was 0.15 g, $ZrO_2$ was 20 g, $CeO_2$—$ZrO_2$—$Y_2O_3$ was 30 g, and $Al_2O_3$ was 30 g.

Comparative Example 4

A catalyst 6 was obtained in the same manner as Example 1, except that the ceria-zirconia composite oxide (B2) obtained from Synthesis Example 2 [i.e., an OSC material having a cubic crystal structure only, in which $CeO_2$: $ZrO_2$: $La_2O_3$=45:45:10 (weight ratio)] was used in an amount of 60 g per liter of the carrier instead of the OSC material 1 of Example 2.

<Evaluation of A/F Purification Property and OSC Property>

As described below, A/F purification property and OSC property were evaluated for the catalysts 1 to 6 which have been obtained from Example 1 and 2 and Comparative Example 1 to 4.

1. Endurance Treatment

Each of the catalysts 1 to 4 (0.7 liter) which have been obtained from Example 1 and Comparative Example 1 to 3 was set on a catalyst converter, which was then placed at downstream position relative to a 3.0 liter MPI engine discharge port, and then exhaust gas was allowed to flow through the catalyst. The exhaust gas used was a gas discharged from an engine operated for 80 hours according to a mode in which a cycle consisting of stoichiometric ratio (A/F=14.6) of 50 seconds, rich (A/F=13.5) of 5 seconds, and fuel cut of 5 seconds was repeated periodically such that the catalyst BED temperature was 1000° C. at most.

Further, for the catalysts 5 and 6 (0.7 liter) which have been obtained from Example 2 and Comparative Example 4, the catalyst (0.7 liter) which has been obtained from Example 1 was set on a catalyst converter, which was then placed at downstream position relative to a 3.0 liter MPI engine discharge port. Further, at downstream position relative to the catalyst converter, a catalyst converter set with the catalysts 5 and 6, respectively, obtained from Example 2 or Comparative Example 4 was disposed, and then exhaust gas was allowed to flow through the catalyst. The exhaust gas used was a gas discharged from an engine operated for 80 hours according to a mode in which a cycle consisting of stoichiometric ratio (A/F=14.6) of 50 seconds, rich (A/F=13.5) of 5 seconds, and fuel cut of 5 seconds was repeated periodically such that the catalyst (catalyst 1) BED temperature was 1000° C. at most and the back stage catalyst (catalyst 5 or 6) BED temperature was 930° C. at most.

2. Evaluation of A/F Purification Property

The converter set with each catalyst obtained after endurance treatment in above Section 1 was placed at downstream side of a 2.4 liter MPI engine. Ina state in which the catalyst inlet temperature is fixed at 500° C. and amplitude of ±1.0 is applied with frequency of 1 Hz, the engine was operated while changing the A/F from 14.1 to 15.1, and exhaust gas was allowed to flow through the catalyst. At that time, the space velocity (SV) was set to 100,000 $hr^{-1}$. Concentration of CO, HC, and NOx was recorded during A/F change, and from a graph in which the longitudinal axis is conversion ratio and the horizontal axis is A/F value, an identifiable crossover point between CO—NOx and HC—NOx was obtained (i.e., COP; a cross-point between CO or HC with NOx). Herein, the higher crossover point (COP) means better catalyst performance. The results are shown in the following Table 1. Meanwhile, for the catalyst 1 disposed at the upstream side of the catalyst 5 or 6, no evaluation was made.

3. Evaluation of OSC Property

The converter set with each catalyst obtained after endurance treatment in above Section 1 was placed at downstream side of a 2.4 liter MPI engine. A catalyst inlet temperature was fixed at 500° C. and the operation was made with A/F of 15.1, which was later changed to 14.3. Time of maintaining stoichiometric ratio A/F (from 14.7 to 14.5) at catalyst exit when the change is made from 15.1 to 14.3 was obtained. The results are shown in the following Table 2. Meanwhile, for the catalyst 1 disposed at the upstream side of the catalyst 5 or 6, no evaluation was made.

TABLE 1

A/F purification property

| Catalyst | CO—NOx | HC—NOx |
|---|---|---|
| Catalyst 1 | 95.3 | 95.4 |
| Catalyst 2 | 94.6 | 94.8 |
| Catalyst 3 | 90.4 | 94.1 |
| Catalyst 4 | 89.1 | 93.7 |
| Catalyst 5 | 99.0 | 98.7 |
| Catalyst 6 | 98.6 | 98.5 |

TABLE 2

OSC property

| Catalyst | Time of maintaining stoichiometric ratio (from 14.7 to 14.5) (seconds) |
|---|---|
| Catalyst 1 | 3.50 |
| Catalyst 2 | 2.92 |
| Catalyst 3 | 2.40 |
| Catalyst 4 | 2.23 |
| Catalyst 5 | 3.60 |
| Catalyst 6 | 1.70 |

From the results of Table 1, it is noted that the catalyst 1 of the present invention has significantly higher crossover point of CO—NOx and HC—NOx as compared to the catalyst 2 in using the OSC material having a cubic crystal structure only, the catalyst 3 using the OSC material having a pyrochlore structure only, and also the catalyst 4 using a mixture of the OSC material having a cubic crystal structure only and the OSC material having a pyrochlore structure only. Similarly, it is noted that the catalyst 5 of the present invention has significantly higher crossover point of CO—NOx and HC—NOx as compared to the catalyst 6 using the OSC material having a cubic crystal structure only. Based on these results, it is considered that the catalyst of the present invention can exhibit excellent performance of purifying an exhaust gas with fluctuating oxygen concentration, even after endurance treatment at 1000° C.

Further, from the results of Table 2, it is also noted that the catalyst 1 of the present invention has significantly extended a time of maintaining stoichiometric ratio (from 14.7 to 14.5) as compared to the catalyst 2 using the OSC material having a cubic crystal structure only, the catalyst 3 using the OSC material having a pyrochlore structure only, and the catalyst 4 using a mixture of the OSC material having a cubic crystal structure only and the OSC material having a pyrochlore structure only. Similarly, it is noted that the catalyst 5 of the present invention has significantly extended a time of maintaining stoichiometric ratio (from 14.7 to 14.5) as compared to the catalyst 6 using the OSC material having a cubic crystal structure only. Based on these results, it is considered that the catalyst of the present invention has excellent oxygen storage capacity (OSC).

The present application is based on Japanese Patent Application No. 2011-019896, which has been filed on Feb. 1, 2011, and its disclosure is incorporated herein by reference in its entirety.

The invention claimed is:

1. A catalyst for purifying an exhaust gas comprising:
an oxygen storing material which has a structure that a ceria-zirconia composite oxide (A) having a pyrochlore structure is partially or entirely coated with a ceria-zirconia composite oxide (B) having a fluorite type cubic crystal structure in a ratio of 50 to 100% relative to a surface area of the ceria-zirconia composite oxide (A).

2. The catalyst according to claim 1, wherein the entire ceria-zirconia composite oxide (A) is coated with the ceria-zirconia composite oxide (B).

3. The catalyst according to claim 1, further comprising at least one noble metal selected from the group consisting of platinum, palladium, and rhodium.

4. The catalyst according to claim 1, further comprising at least one member selected from the group consisting of a refractory inorganic oxide and a refractory inorganic oxide including a rare earth metal excluding cerium, a transition metal excluding zirconium, and an alkali earth metal.

5. A method for purifying an exhaust gas comprising a step of exposing the catalyst set forth in claim 1 to an exhaust gas discharged from a combustion engine.

6. The catalyst according to claim 1, which is obtained by mixing the ceria-zirconia composite oxide (A) with an aqueous solution of raw materials containing raw material of cerium and raw material of zirconium to obtain a mixture, adding to the mixture ammonia or an aqueous solution of ammonia to co-precipitate cerium hydroxide and zirconium hydroxide, and drying and calcining the co-precipitated product.

7. The catalyst according to claim 1, wherein the ceria-zirconia composite oxide (A) has a particle shape, column shape, cone shape, prism shape, cubic shape, pyramid shape, or amorphous shape.

8. The catalyst according to claim 1, wherein the ceria-zirconia composite oxide (A) has an average particle diameter of 1 to 100 μm.

9. The catalyst according to claim 1, wherein the ceria-zirconia composite oxide (A) has an average particle diameter of 1 to 20 μm.

10. The catalyst according to claim 1, wherein the ceria-zirconia composite oxide (A) has an average particle diameter of 0.3 to 2.0 μm.

11. The catalyst according to claim 1, wherein the ceria-zirconia composite oxide (A) has an average particle diameter of 0.5 to 1.5 μm.

12. The catalyst according to claim 1, wherein the ceria-zirconia composite oxide (A) has a specific surface area of 0.1 to 20 m$^2$/g.

13. The catalyst according to claim 1, wherein the ceria-zirconia composite oxide (A) is coated with the ceria-zirconia composite oxide (B) having a fluorite type cubic crystal structure in a ratio of 75 to 100% relative to the surface area of the ceria-zirconia composite oxide (A).

* * * * *

UNITED STATES PATENT AND TRADEMARK OFFICE
CERTIFICATE OF CORRECTION

PATENT NO. : 9,539,542 B2
APPLICATION NO. : 13/983022
DATED : January 10, 2017
INVENTOR(S) : Kosuke Mikita et al.

Page 1 of 1

It is certified that error appears in the above-identified patent and that said Letters Patent is hereby corrected as shown below:

On the Title Page

Item (73), please insert -- UMICORE SHOKUBAI USA, INC., Auburn Hills, Michigan -- as the second Assignee.

Signed and Sealed this
Fourth Day of September, 2018

Andrei Iancu
*Director of the United States Patent and Trademark Office*